(12) United States Patent
Durig

(10) Patent No.: US 8,185,092 B1
(45) Date of Patent: May 22, 2012

(54) SELECTIVE SCANNING FOR WLAN COVERAGE BY A MULTI-MODE DEVICE

(75) Inventor: Daniel R. Durig, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/195,828

(22) Filed: Aug. 1, 2011

Related U.S. Application Data

(63) Continuation of application No. 12/105,202, filed on Apr. 17, 2008, now Pat. No. 8,019,296.

(51) Int. Cl.
    *H01Q 11/12* (2006.01)
    *H04B 1/26* (2006.01)
    *H04M 1/00* (2006.01)
    *H04B 1/04* (2006.01)

(52) U.S. Cl. ............ 455/411; 455/127.4; 455/343.1; 455/552.1

(58) Field of Classification Search .......... 455/552.1, 455/434.1, 435, 436, 422, 442, 403, 414, 455/553, 443–445, 132, 437, 440, 434, 550, 455/426, 13, 168, 127, 573, 575; 370/331–338, 370/289, 401, 329, 310, 311
See application file for complete search history.

(56) References Cited

U.S. PATENT DOCUMENTS

| | | | | |
|---|---|---|---|---|
| 4,554,321 A | * | 11/1985 | Hwo et al. | 525/240 |
| 4,554,323 A | * | 11/1985 | Yuki et al. | 525/272 |
| 4,554,352 A | * | 11/1985 | Ranken | 546/156 |
| 4,554,561 A | * | 11/1985 | Daniele et al. | 347/234 |
| 5,500,304 A | * | 3/1996 | Loffler et al. | 428/614 |
| 5,506,711 A | * | 4/1996 | Takeyari | 398/58 |
| 5,627,882 A | | 5/1997 | Chien et al. | |
| 6,002,918 A | | 12/1999 | Heiman et al. | |
| 6,184,563 B1 | | 2/2001 | Yu | |
| 6,480,476 B1 | | 11/2002 | Willars | |
| 6,748,246 B1 | | 6/2004 | Khullar | |
| 6,847,823 B2 | | 1/2005 | Lehikoinen et al. | |
| 7,200,397 B1 | | 4/2007 | Jones et al. | |
| 7,277,710 B1 | | 10/2007 | Jones et al. | |
| 7,283,507 B2 | | 10/2007 | Buckley et al. | |
| 7,580,397 B2 | | 8/2009 | Arai et al. | |
| 7,593,730 B2 | | 9/2009 | Khandelwal et al. | |
| 7,671,567 B2 | | 3/2010 | Eberhard et al. | |
| 7,702,329 B1 | | 4/2010 | Durig et al. | |
| 7,761,087 B2 | | 7/2010 | Kharia et al. | |
| 7,894,812 B1 | | 2/2011 | Durig et al. | |
| 7,924,785 B2 | | 4/2011 | Shaheen et al. | |

(Continued)

FOREIGN PATENT DOCUMENTS

WO      2004031488      4/2004

*Primary Examiner* — Kent Chang
*Assistant Examiner* — Kashif Siddiqui

(57) ABSTRACT

Methods and systems are provided for selective scanning for WLAN coverage by a multi-mode device. In at least one embodiment, the multi-mode device determines whether it is both charging and authenticated via a wireless network that operates according to a first protocol, and if it is both, responsively storing reference data—in a profile corresponding with that wireless network—that reflects a current environment of a second wireless network that operates according to a second air-interface protocol that is different from the first. At a later point in time, the multi-mode device detects that a current environment of the second wireless network sufficiently matches the stored reference data, and responsively scanning for coverage according to the first air-interface protocol.

25 Claims, 6 Drawing Sheets

U.S. PATENT DOCUMENTS

| | | |
|---|---|---|
| 2002/0147008 A1 | 10/2002 | Kallio |
| 2002/0187780 A1 | 12/2002 | Souissi |
| 2003/0118015 A1 | 6/2003 | Gunnarsson et al. |
| 2003/0134636 A1 | 7/2003 | Sundar et al. |
| 2003/0208628 A1 | 11/2003 | Karjanlahti |
| 2004/0066756 A1 | 4/2004 | Ahmavaara et al. |
| 2004/0165563 A1 | 8/2004 | Hsu et al. |
| 2004/0176024 A1 | 9/2004 | Hsu et al. |
| 2004/0192211 A1 | 9/2004 | Gallagher et al. |
| 2004/0264410 A1 | 12/2004 | Sagi et al. |
| 2005/0176420 A1 | 8/2005 | Graves et al. |
| 2005/0181779 A1 | 8/2005 | Jones et al. |
| 2005/0261970 A1 | 11/2005 | Vucina et al. |
| 2006/0209773 A1 | 9/2006 | Hundal et al. |

* cited by examiner

| NAME | SSID | BSSID | PASSWORD | SID | NID | PZID | PN LIST |
|---|---|---|---|---|---|---|---|
| Home | SSID1 | BSSID1 | Password1 | SID_City1 | NID_1A | PZID_1A | {A, B, C} |
| Office | SSID2 | BSSID2 | Password2 | SID_City1 | NID_1B | PZID_1B | {D, E, F} |
| Campus | SSID3 | BSSID3 | Password3 | SID_City1 | NID_1B | PZID_1B | {G, H, I} |
| Airport | SSID4 | BSSID4 | Password4 | SID_City1 | NID_1B | PZID_1B | {J, K, L} |
| Cottage | SSID5 | BSSID5 | Password5 | SID_City2 | NID_2 | PZID_2 | {M, N, O} |
| Hotel | SSID6 | BSSID6 | Password6 | SID_City3 | NID_3A | PZID_3A | {P, Q, R} |
| Ad hoc | [ ] | [ ] | | [N/A] | [N/A] | [N/A] | [N/A] |

WLAN PROFILES 230

TIMER VALUE 240

WWAN DATA 250

DEVICE DATA 214

FIG. 2B

SELECTIVE SCANNING FOR WLAN COVERAGE BY A MULTI-MODE DEVICE

CROSS-REFERENCE TO RELATED APPLICATIONS

This application is a continuation of U.S. patent application Ser. No. 12/105,202, filed Apr. 17, 2008 now U.S. Pat. No. 8,019,296 and entitled "Selective Scanning for WLAN Coverage by a Multi-Mode Device."

BACKGROUND

1. Technical Field

The present invention relates to wireless communications and, more particularly, to methods and systems for operating multi-mode communication devices.

2. Description of Related Art

More people than ever are using mobile stations, such as cell phones and personal digital assistants (PDAs), to communicate via wireless wide area networks (WWANs), which are also referred to as cellular wireless communication systems, cellular wireless networks, radio access networks and by other names. WWANs typically provide both voice and data communication using a wireless communication format such as Code Division Multiple Access (CDMA), or another format, and typically cover relatively large geographic areas (cities, states, etc.), and are available to the service provider's (i.e. the WWAN operator's) customers generally.

Furthermore, wireless local area networks (WLANs) are becoming increasingly popular. Typical WLANs cover an area that is geographically smaller than that covered by typical WWANs, and often provide a signal in that area that is superior to that provided by the WWAN in the same location. As examples, a WLAN may cover a residence, a building, or a proximally-located group of buildings, perhaps on a corporate or academic campus. Unlike WWANs, WLANs are typically operated by a private individual or organization, and access to the WLAN is typically limited thereto, and to those to whom access data (e.g. a password) is provided.

WLANs typically provide a wireless coverage area and access to a packet-data network via one or more "access points." A common use of a WLAN is packet-data communication by a laptop computer, or perhaps by another device such as a digital video recorder or another appliance or computer. A commonly-used set of protocols for wireless communication between and among these access points and devices are those specified by the Institute of Electrical and Electronics Engineers (IEEE) 802.11 standards, often referred to as "IEEE 802.11x."

Recently, the telecommunications industry has witnessed widespread growth in the area of voice-over-IP (VoIP) technology; that growth, combined with the ever-increasing prevalence of mobile stations engaging in packet-data communication generally, has caused the industry to introduce mobile stations ("multi-mode devices") that are equipped to engage in both (i) voice and data communications via WWANs (using, e.g. CDMA) and (ii) packet-data communications (including VoIP communications) via WLANs (using, e.g. IEEE 802.11).

In one arrangement, for instance, a service provider may operate one or more gateways that provide connectivity between a packet-switched network (e.g. the Internet) and the service provider's transport and signaling networks. The carrier may then distribute multi-mode devices to its subscribers, where those devices are capable of (a) communicating in a WWAN mode with one or more types of WWANs and (b) communicating in a WLAN mode with one or more types of WLANs. And these devices are typically also able to operate in a combined WWAN/WLAN mode, in which the devices can at least monitor and perhaps engage in communication sessions (e.g. voice calls and data sessions) with both types of networks.

When a multi-mode device is communicating with a WWAN, the device may operate conventionally as a standard cellular telephone, with signaling passing through the service provider's signaling network and bearer data passing through the service provider's transport network. On the other hand, when the multi-mode device is communicating with a WLAN, the device may engage in IP-based signaling and IP-based bearer communication via the WLAN with the service provider's gateway(s), which may then interface the signaling and bearer communications with the service provider's signaling and transport networks.

SUMMARY

In one aspect, the present invention may take the form of a method, in accordance with which a multi-mode device determines whether it is charging and whether it is authenticated via a wireless network that operates according to a first air-interface protocol. If the multi-mode device is charging and is so authenticated, it stores reference data in a profile corresponding with the wireless network that operates according to the first protocol and via which the multi-mode device is authenticated, the reference data reflecting a current environment of a wireless network that operates according to a second air-interface protocol. If the multi-mode device is charging and is not so authenticated, it scans once every first amount of time for at least one wireless network that operates according to the first protocol.

If the device is not charging and is not so authenticated, it iteratively: (a) calculates a scanning period based at least in part on comparing the current environment of the wireless network that operates according to the second protocol with reference data from at least one stored profile that (1) corresponds with a wireless network that operates according to the first protocol and (2) includes reference data for the wireless network that operates according to the second protocol; and (b) scans once every scanning period for at least one wireless network that corresponds with a stored profile.

In another aspect, the present invention may take the form of a multi-mode device comprising a first wireless-communication interface for communicating according to a first air-interface protocol, a second wireless-communication interface for communicating according to a second air-interface protocol different from the first, a processor, and data storage having program instructions executable by the processor for carrying out the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2B is a simplified block diagram of an exemplary set of data that may be stored by a multi-mode device, in accordance with exemplary embodiments;

DETAILED DESCRIPTION OF EXEMPLARY EMBODIMENTS

1. Overview

Figure 1:
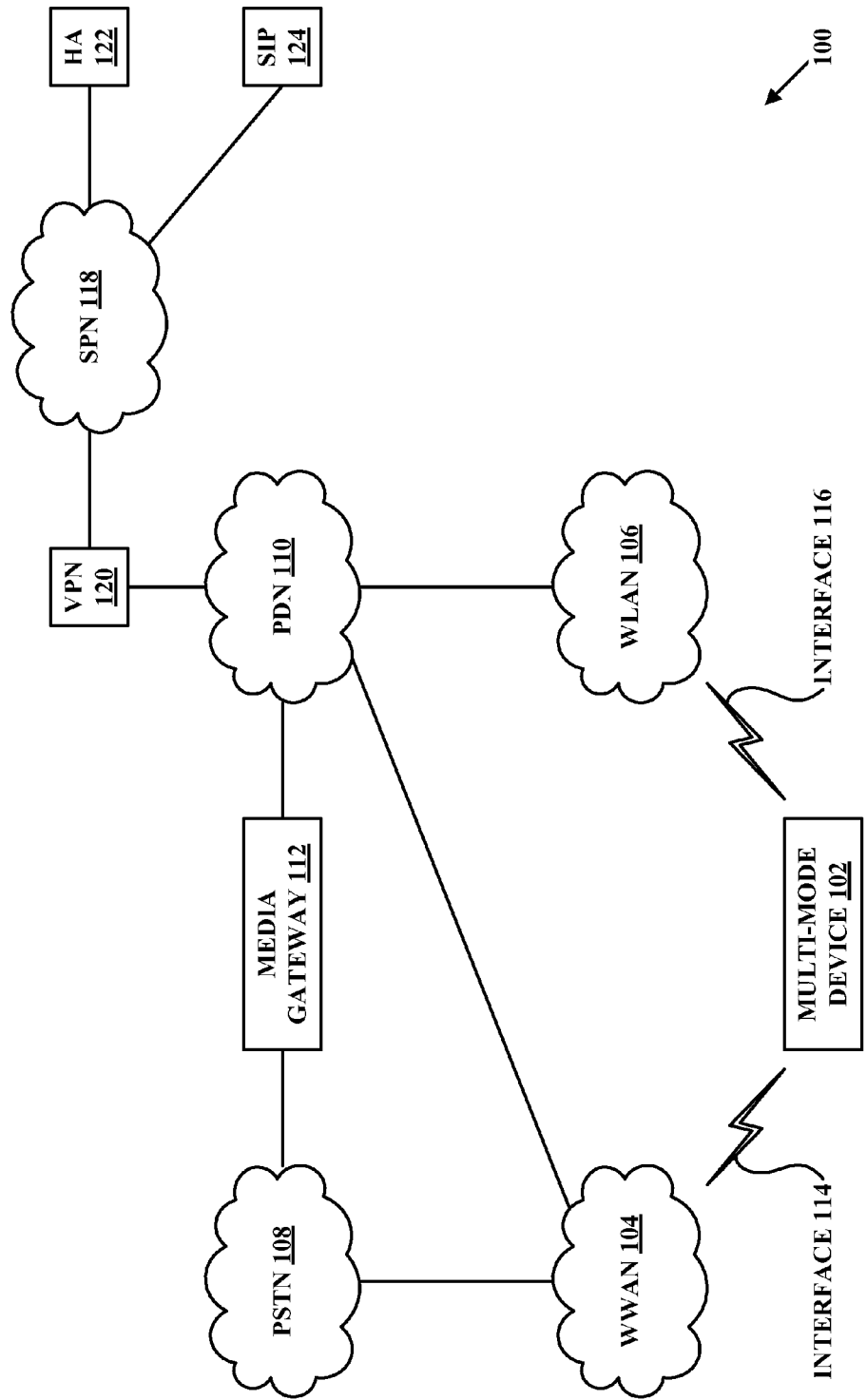
FIG. 1 is a simplified block diagram of an example of a communication system, in accordance with exemplary embodiments.

In general, as noted above, WWANs generally have a much larger coverage area (i.e. footprint) than do WLANs. Accordingly, it is typically the case that multi-mode devices have their WWAN-communication capability enabled at substantially all times (i.e. they are usually in either a "WWAN only" mode or a "combined WWAN/WLAN" mode). When operating in the combined WWAN/WLAN mode (and not connected to a WLAN), multi-mode devices are typically programmed to occasionally scan for WLAN coverage (e.g. attempt to detect a WLAN beacon corresponding to a WLAN access point). This may involve scanning for any available WLANs, scanning for WLANs associated with sets of data already stored in the multi-mode device, or perhaps a combination thereof. Upon finding a suitable WLAN to which to connect, multi-mode devices may conduct what is known as a vertical handoff from the WWAN to the WLAN. This handoff is referred to as being vertical because it involves handing off between disparate air-interface protocols (from, e.g., CDMA or WiMax to, e.g., 802.11).

In general, if a multi-mode device carries out its WLAN-scanning operation continuously or too frequently, it may very well undesirably occupy its processing and memory resources for these operations, and undesirably drain its battery power. As such, some existing multi-mode devices are arranged to scan on a periodic (though not overly-frequent) basis. Others are arranged to scan for WLAN coverage in response to receiving a user command to do so. Other approaches involve provisioning multi-mode devices with mappings between (a) various locations (e.g. Global Positioning System (GPS) coordinates) or WWAN parameters (e.g. cell or sector IDs) and (b) particular WLANs—thus, when the device identifies that it is in or near a particular location or WWAN reference point, the device may scan for WLAN coverage. In other implementations, multi-mode devices may request WLAN information associated with their current location and/or current WWAN environment from the WWAN.

In accordance with the present invention, a multi-mode device comprises storage for storing one or more sets of data, each set respectively associated with a given WLAN. Each such data set is referred to herein as a WLAN profile, and may include information such as a Service Set Identifier (SSID), Basic Service Set Identifier (BSSID) (a.k.a. wireless Media Access Control (MAC) address), and wireless-security access data (e.g. password) for the corresponding WLAN. The multi-mode device may be arranged to store on the order of six WLAN profiles, each corresponding to a WLAN to which the multi-mode device is able and permitted to connect. Example WLAN profiles could be named "Home," "Office," "Campus," etc. And this number of WLAN profiles is merely an example; any other number could be used. Furthermore, each profile comprises storage for one or more WWAN parameters, as described more fully below. And a multi-mode device may also comprise storage for what is referred to herein as an "ad-hoc" WLAN profile, enabling the multi-mode device to connect to a WLAN for which the multi-mode device does not have a stored WLAN profile.

Furthermore, the multi-mode device may store a predefined timer value (such as four seconds, 1000 milliseconds (ms), etc.), and dynamically periodically assess a variety of factors to identify a respective multiplicand associated with each factor. These multiplicands and the timer value are then all multiplied together to calculate a scanning period. The device then scans for WLAN coverage on a periodic basis based on that value, i.e. once every scanning period. In an embodiment, the assessed factors are (i) how many of a set of WWAN pseudorandom number (PN) offsets in any (or in any one) of the stored WLAN profiles are currently detected (e.g. are currently among a set number of the strongest PN offsets in the multi-mode device's active set), (ii) what combination (if any) of other WWAN parameters (e.g. System Identification Code (SID), Network Identification Code (NID), and Packet Zone ID (PZID)) in any (or in any one) of the stored WLAN profiles are currently detected, and (iii) how many scans have been made since last resetting a count of scans made (without finding a WLAN to which to connect).

In other embodiments, additional multiplicands for computing the scanning period are derived from factors such as (iv) whether WLAN (i.e. WiFi (802.11)) communication is currently enabled on the device, (v) whether a WLAN scan is currently in progress, and/or (vi) whether a user of the multi-mode device has recently disconnected from the WLAN or canceled a WLAN scan. And other factors and inputs may be used instead or in addition, such as (vii) whether or not the multi-mode device is charging, and/or any others.

Each of these factors is assessed in a manner suitable to the respective factor to determine an associated multiplicand. These multiplicands are then multiplied together, and the product thereof is then multiplied by the predefined timer value, to arrive at a determined scanning period. This may result in a scanning period of zero (i.e. no scanning would take place, maximizing savings in terms of processing resources and battery power) (if at least one of the multiplicands is zero), a scanning period that is less than the predefined timer value (if the product of the multiplicands is less than one), a scanning period of exactly the predefined timer value (if the product of the multiplicands is one), or a scanning period that is greater than the predefined timer value (if the product of the multiplicands is greater than one).

In one embodiment, rather than using factor (vii) listed above (charging) to determine a multiplicand, a multi-mode device operates in two different manners, depending on whether or not it is charging (i.e. whether or not it is connected to a wall charger, vehicle charger, charging cradle, etc.). When charging and not connected via a WLAN to a given network entity (e.g. the WLAN access point, a Virtual Private Network (VPN) terminator, a Mobile IP home agent, and/or a Session Initiation Protocol (SIP) registrar, etc.), the device scans for WLAN coverage once every, for example, two minutes, without regard to factors such as WWAN environment or current number of (failed) scans. When charging and connected to (i.e. authenticated with) one or more of the above-listed entities via a WLAN, the device responsively updates the WLAN profile associated with the WLAN to which it is connected, such that the profile will then reflect the current WWAN environment (e.g. SID, NID, PZID, and (e.g.) three strongest PN offsets).

Further, when the device is not charging (but is in combined WWAN/WLAN mode and not currently authenticated with its network via a WLAN), the device will use the multiplicand approach described above to determine its WLAN-coverage-scanning period. Thus, the device may use the first three factors listed above (PN offsets, other WWAN parameters (SID, NID, and PZID), and number of (failed) scans) to respectively determine three suitable multiplicands, and then multiply those multiplicands by each other and by the predefined timer value to calculate a scanning period. The device may then repeatedly scan once per calculated scanning period. If the device repeatedly fails to connect, the number of scans will tick upwards, resulting in greater and greater multiplicands, and thus less-frequent scanning.

In some embodiments, this may continue while the detected WWAN parameters remain equally good matches to the WLAN profiles or begin to match less well (if for example, the user is driving away from home and thus matching fewer and fewer PN offsets from a "Home" WLAN profile). Furthermore, upon detecting events that increase the degree to which one or more WLAN profiles match the current WWAN environment (such as may occur if a user is driving back towards home and thus matching, say, more and more PN offsets, the SID, NID, and PZID from the "Home" WLAN profile), the device may immediately conduct a scan and/or reset the number-of-scans count (i.e. to 0 or 1), so as to reduce the associated multiplicand and increase the frequency of scanning for WLAN coverage. And other possibilities exist, without departing from the scope and spirit of the present invention.

In some embodiments, one or more of the WLAN profiles may be provisioned into the multi-mode device by the service provider (e.g. the WWAN operator). In other embodiments, the device may initially have empty profiles. The user may then be able to manually initiate a WLAN-coverage scan using a button, soft button, menu option, or the like. Upon properly authenticating to a given WLAN, and perhaps also authenticating to one or more network entities via the WLAN, the device may store a WLAN profile to correspond to that WLAN, and may include in that WLAN profile data that reflects the currently-detected WWAN environment (e.g. SID, NID, PZID, and some number of the strongest PN offsets (e.g. the three strongest)).

And it should be noted that the above overview is meant to be illustrative, not limiting. That is, additional and/or different features may be present in some embodiments of the present invention. It should be noted as well that the description of a WWAN and a WLAN, and of the WWAN operating according to CDMA and the WLAN operating according to 802.11, are examples; the present invention may be applied to any context in which a device (e.g. a mobile station) can operate in multiple modes associated with different air-interface protocols, and scans for coverage according to at least one protocol while operating in another. As examples, a multi-mode device may operate according to any two or more of CDMA, EV-DO, iDEN, TDMA, AMPS, GSM, GPRS, UMTS, EDGE, WiMAX (e.g. IEEE 802.16), LTE, microwave, satellite, MMDS, Wi-Fi (e.g. IEEE 802.11), Bluetooth, infrared, and/or any other wireless technology or technologies now known or later developed.

2. Exemplary Architecture a. Exemplary Communication System

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a multi-mode device 102, a WWAN 104, a WLAN 106, a public switched telephone network (PSTN) 108, a packet-data network (PDN) 110, a media gateway 112, air interfaces 114 and 116, a service-provider network (SPN) 118, a VPN terminator 120, a Mobile-IP home agent (HA) 122, and a SIP registrar 124. The entities depicted in FIG. 1 are illustrative; for example, there could be any number of multi-mode devices and other devices in communication with WWAN 104, WLAN 106, PSTN 108, PDN 110, and/or SPN 118. As another example, there could be any number of intermediate devices (e.g. routers, switches) and networks making up all or part of any of the communication links; and there could be links in addition to or different from those depicted.

Multi-mode device 102 may be any mobile device capable of communicating with one or more WWANs, such as WWAN 104, and with one or more WLANs, such as WLAN 106. Multi-mode device 102 may communicate with WWAN 104 over air interface 114 using a protocol such as CDMA (or another protocol) and with WLAN 106 over air interface 116 using a protocol such as IEEE 802.11 (or another protocol). Multi-mode device 102 is described more fully in connection with FIGS. 2A and 2B, and may, in general, be any device capable of communicating with both WWANs and WLANs (or more generally with at least two networks using different air-interface protocols), and of carrying out the multi-mode-device functions described herein. As examples, device 102 may be a cellular phone, PDA, or laptop computer.

Figure 3:
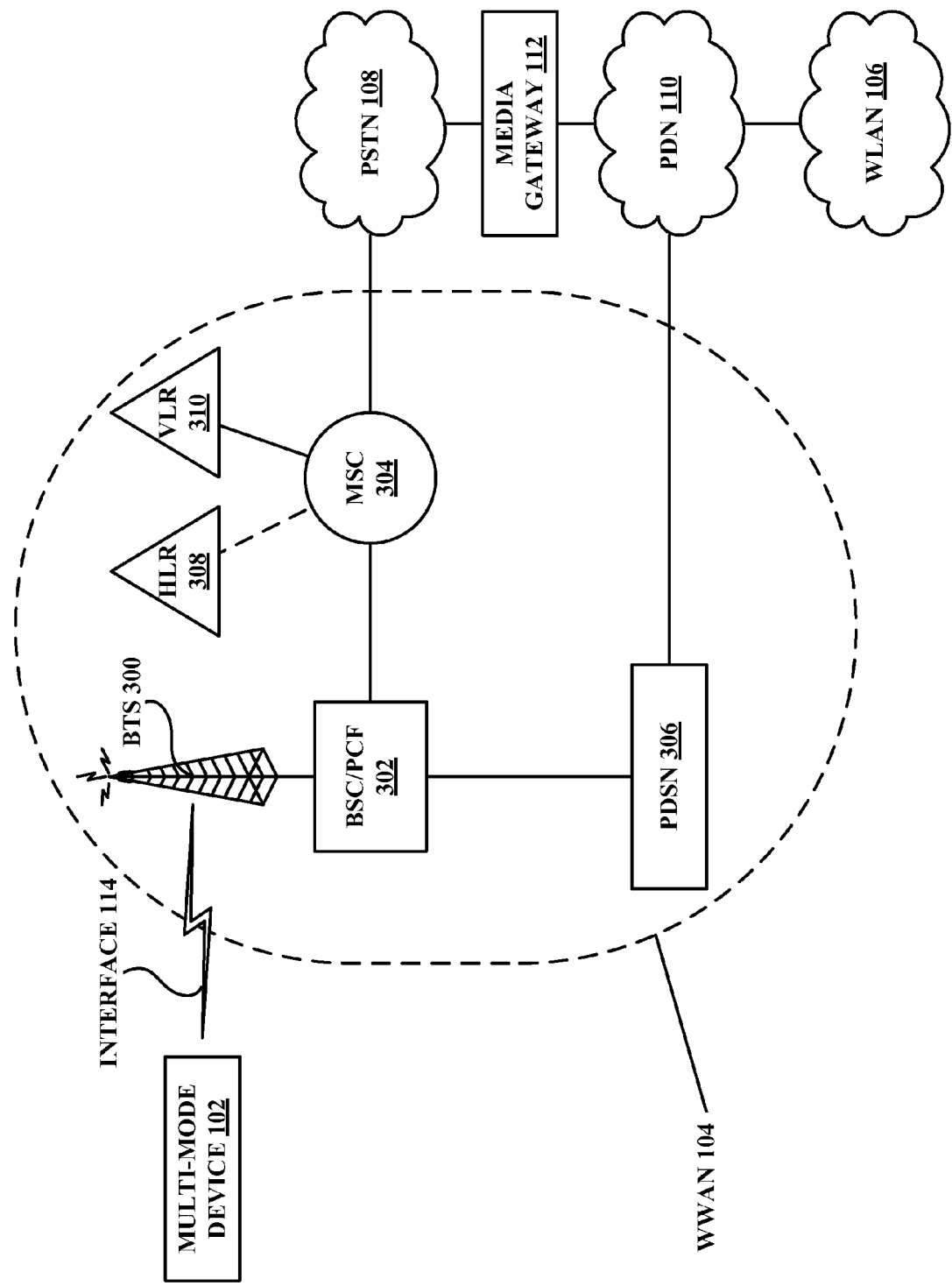
FIG. 3 is a simplified block diagram of an exemplary wireless wide area network (WWAN), in accordance with exemplary embodiments.

WWAN 104 is explained more fully in connection with FIG. 3, but in general may be any WWAN capable of communicating over air interface 114 with devices such as multi-mode device 102, using a wireless communication protocol such as CDMA (or another protocol such as WiMax, etc.). One such wireless protocol is the well-known cdma2000®, as described in "CDMA 2000® Series," TIA/EIA/IS-2000 Series, Rev. A (March 2000), which is incorporated herein by reference. WWAN 104 may be communicatively coupled with at least PSTN 108, PDN 110, and one or more mobile devices, such as multi-mode device 102.

Figure 4:
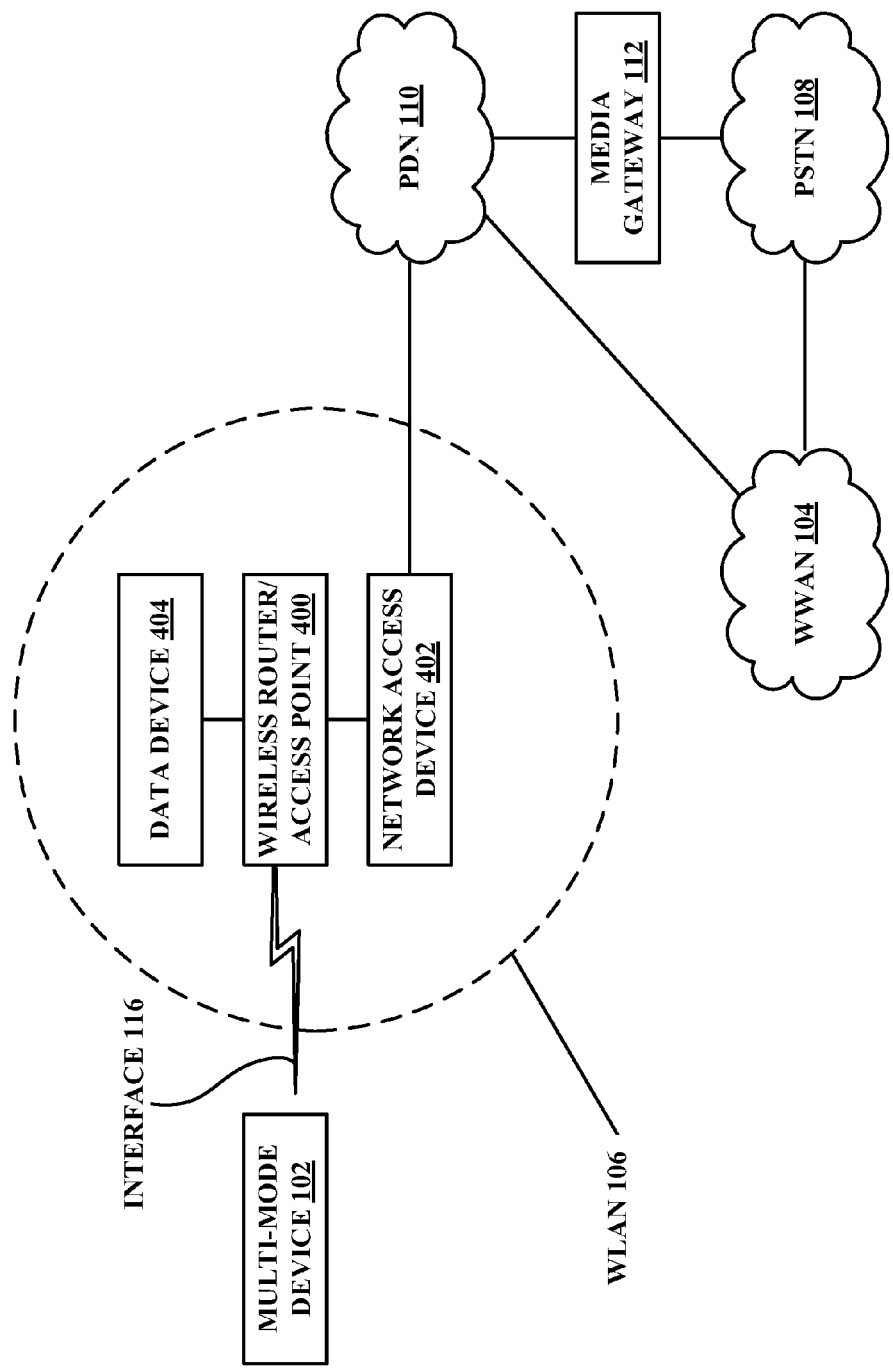
FIG. 4 is a simplified block diagram of an exemplary wireless local area network (WLAN), which may be used in accordance with exemplary embodiments.

WLAN 106 is explained more fully in connection with FIG. 4, but in general may be a WLAN capable of communicating over air interface 116 with mobile devices such as device 102, using a wireless communication protocol such as IEEE 802.11g™, as described in "IEEE Standard for Information Technology, Telecommunications and Information Exchange Between Systems, Local and Metropolitan Area Networks, Specific Requirements, Part 11: Wireless LAN Medium Access Control (MAC) and Physical Layer (PHY)

Specifications, Amendment 4: Further Higher Data Rate Extension in the 2.4 GHz Band," published June 2003, which is incorporated herein by reference. The use of 802.11g™ is exemplary; other 802.11 standards and/or other wireless protocols (such as Bluetooth®, HiperLAN, MMDS, and HomeRF, as examples) could be used. WLAN 106 may be communicatively coupled with at least PDN 110 and one or more mobile devices, such as multi-mode device 102.

PSTN 108 may be the known circuit-switched network referred to as the Public Switched Telephone Network, and may be communicatively coupled with at least WWAN 104 and media gateway 112. PDN 110 may be communicatively coupled with at least WWAN 104, WLAN 106, media gateway 112, and VPN terminator 120, and may include one or more Wide Area Networks (WANs), one or more Local Area Networks (LANs), one or more public networks such as the Internet, one or more private networks, one or more wired networks, and/or one or more wireless networks. Devices in communication with PDN 110 may exchange data using a packet-switched protocol such as IP, and may be identified by an address such as an IP address.

Media gateway 112 may be a networking device (such as a server) arranged to pass communications between PSTN 108 and PDN 110. As such, media gateway 112 may have one interface for communicating with PSTN 108 and another interface for communicating with PDN 110. Gateway 112 may receive circuit-switched communications from PSTN 108, convert those communications to a packet-based format, and transmit those communications to PDN 110. Gateway 112 may also receive packet-based communications from PDN 110, convert those communications to a circuit-switched format, and transmit those communications to PSTN 108.

SPN 118 may be a private packet-switched (e.g. IP) network operated by the service provider that provides service to mobile stations via WWAN 104 (and that may also provide WLAN access points for service via WLANs such as WLAN 106). In general, SPN 118 may include one or more packet-switched networks, one or more circuit-switched networks, one or more signaling networks, one or more wired networks, one or more wireless networks, and/or one or more networks of any other type. SPN 118 may have connections to PDN 110 other than via VPN terminator 120, such as via one or more network access servers. Furthermore, SPN 118 may have one or more connections—that do not involve PDN 110—to WWAN 104, WLAN 106, PSTN 108, and/or any other networks or entities. And other arrangements are possible.

VPN terminator 120, home agent 122, and SIP registrar 124 may each be a network device, such as a server, comprising at least one network interface, processor, and data storage comprising program instructions executable by their respective processor(s) for carrying out their respective functions. VPN terminator 120 may function to establish VPN connections with devices such as multi-mode device 102, enabling those devices to securely communicate with entities on SPN 118, among other functions. Home agent 122 may function as a Mobile-IP home agent, assigning home addresses and maintaining mobility bindings for entities such as multi-mode device 102, among other functions. SIP registrar 124 may function as a SIP registrar, maintaining registration information for SIP entities such as device 102, among other functions. And home agent 122 and/or SIP registrar 124 may reside on a network other than SPN 118.

b. Exemplary Multi-Mode Device

Figure 2A:
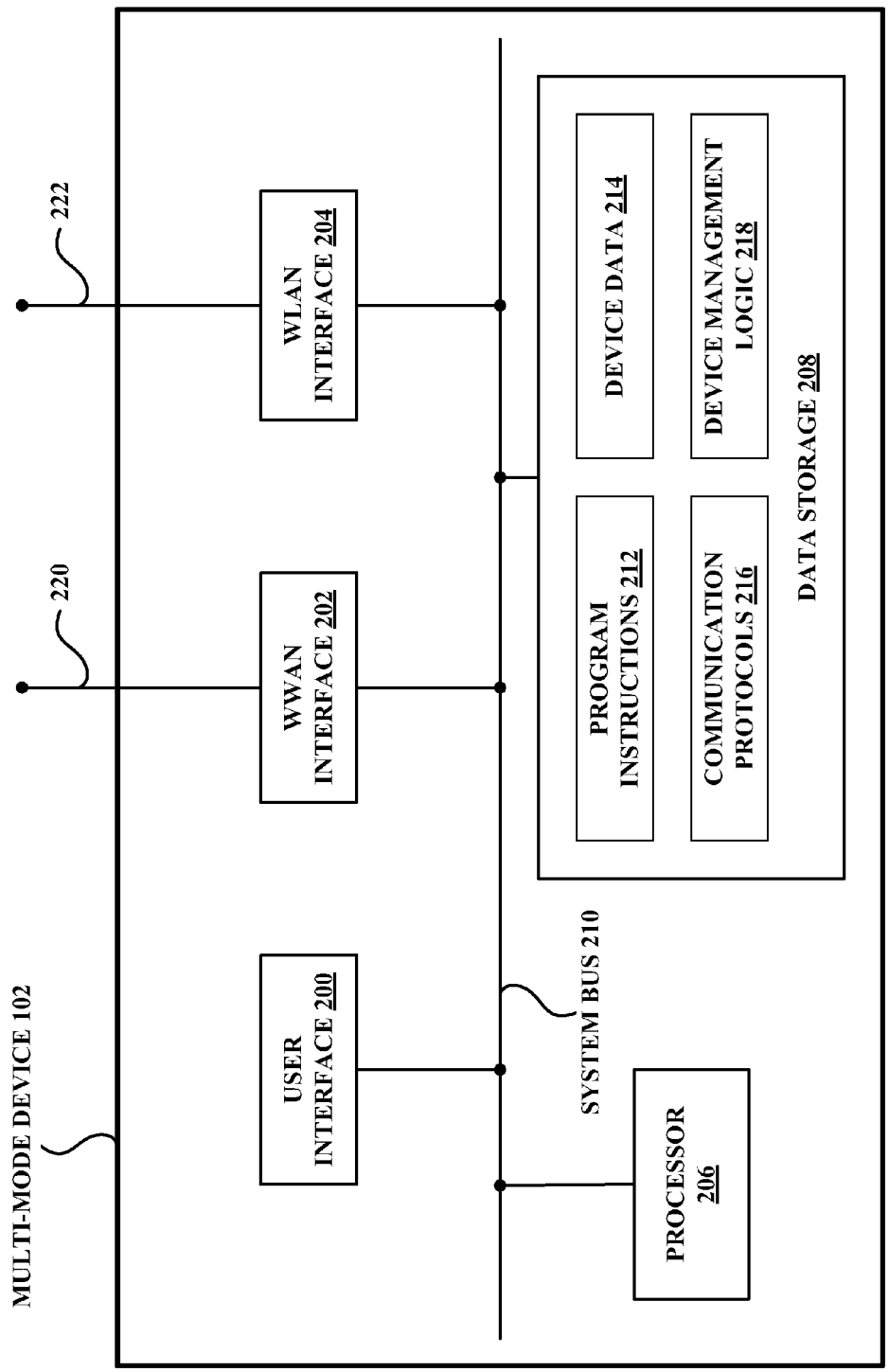
FIG. 2A is a simplified block diagram of an exemplary multi-mode device, which may be used in accordance with exemplary embodiments.

FIG. 2A is a simplified block diagram of an exemplary multi-mode device, which may be used in accordance with exemplary embodiments. In particular, FIG. 2A depicts multi-mode device 102 of FIG. 1. As shown in FIG. 2A, multi-mode device 102 includes a user interface 200, a WWAN interface 202, a WLAN interface 204, a processor 206, and data storage 208, all of which may be communicatively linked by a system bus 210. In general, multi-mode device 102 may be any device arranged to communicate over air interfaces with WWANs and WLANs (i.e. multiple networks operating according to respectively different air-interface protocols), and carry out the multi-mode-device functions described herein.

User interface 200 includes one or more mechanisms for receiving inputs from users, and one or more mechanisms for communicating outputs to users. Mobile-station user interfaces are known in the art, and thus are not described in detail here. Suffice it to say that user interface 200 may include buttons, a touch screen, a microphone, and any other mechanisms now known or later developed for receiving inputs, as well as an LCD or other display, speakers, and any other mechanisms now known or later developed for communicating outputs.

WWAN interface 202 may be a chipset arranged to communicate over air interface 114 with WWAN 104 according to a protocol such as cdma2000® (or some other protocol such as WiMax). This chipset may interface with an antenna 220 to facilitate communication with WWAN 104. WLAN interface 204 may be a chipset arranged to communicate over air interface 116 with WLAN 106 according to a protocol such as IEEE 802.11 (or another WLAN protocol, or another protocol). This chipset may interface with antenna 222 to facilitate communication with WLAN 106. It should be understood that WWAN interface 202 and WLAN interface 204 may share a common antenna. Further, the two interfaces may be integrally formed, or may in fact be a single interface, such as a single chipset capable of communication with both WWAN 104 and WLAN 106. And other arrangements are possible as well.

Processor 206 may control many operations of multi-mode device 102 by executing a set of program instructions 212 stored in data storage 208, and may comprise multiple (e.g., parallel) processors, such as a general purpose microprocessor and/or a discrete digital signal processor. Data storage 208 may store program instructions 212, device data 214 (described below in connection with FIG. 2B), communication protocols 216, and device management logic 218. Data storage 208 may take various forms, in one or more parts, such as a non-volatile storage block and/or a removable storage medium.

Program instructions 212 may be executable by processor 206 to carry out various functions described herein. Communication protocols 216 may be useful to receive data from and send data to WWAN 104, WLAN 106, and beyond, and may include one or more protocols mentioned herein, and/or one or more other protocols. Compatible protocols may be stored in other entities in communication with multi-mode device 102. Device management logic 218 may be used to manage functions such as memory and file management.

FIG. 2B is a simplified block diagram of an exemplary set of data that may be stored by a multi-mode device, in accordance with exemplary embodiments. In particular, FIG. 2B is a diagram of device data 214 of FIG. 2A. As shown in FIG. 2B, device data 214 comprises WLAN profiles 230, a timer value 240, and WWAN data 250. And it should be noted that device data 214 may include additional and/or different values, and may be arranged differently, without departing from the invention.

WLAN profiles 230 is a list of one or more (in this case six) stored WLAN profiles, as well as space for one "Ad hoc"

profile. Each stored WLAN profile is represented by one of the first six rows in the table. Each profile has a name (e.g. Home), an SSID, a BSSID, a password (e.g. a Wireless Encryption Protocol (WEP) key), a SID, a NID, a PZID, and a list of some number (here, three) of PN offsets. Note that each profile could have additional and/or different data, and that this table is provided by way of illustration and not limitation. And note that, in each profile, the Name, SSID, BSSID, and Password fields may be relatively static in comparison to the SID, NID, PZID fields, which may themselves be more static than the PN List. Additionally, the data in each cell of the table could take any form including one or more data values, as the indications shown in FIG. 2B are representative.

And note as well that, at a given time, one or more of the stored WLAN profiles (or perhaps all of them) could be empty. Note also that one, some, or all of the stored profiles may be provisioned to some extent (e.g. SSID and password), or perhaps not at all. In some embodiments, WLAN profiles may store an SSID but not a BSSID, or vice versa. And some profiles may not need a password (or other access data), while some may have access data in addition to or instead of a password. Finally, note that the Ad hoc profile may be empty at most times, being generally available for temporary storage of WLAN data for a WLAN other than those associated with the stored profiles, and that the Ad hoc profile may well have no use for WWAN parameters such as a SID, NID, etc. (though it might), since reacquisition of a WLAN for which the Ad hoc profile is used may be deemed unlikely or at least not worth data storage.

Timer value 240 may at a given time be equal to any amount of time, such as 4 seconds, 1000 ms, or any other value. This value may be provisioned into multi-mode device 102 upon manufacture, initial configuration, over the air, or set according to some other approach, and it may be updated from time to time.

WWAN data 250 may include currently-detected or at least recently-detected WWAN parameters such as (in the case of a CDMA WWAN) a SID, NID, and PZID, as well as an active set, candidate set, neighbor list, signal strengths of sectors (i.e. PN offsets) found on the active set, candidate set, and neighbor list, a number of the strongest currently-detected PN offsets (along with the associated signal strengths), and/or any other WWAN parameters.

c. Exemplary Wireless Wide Area Network (WWAN)

FIG. 3 is a simplified block diagram of an exemplary WWAN, in accordance with exemplary embodiments. In particular, FIG. 3 is a diagram of WWAN 104 of FIG. 1. It should be understood that a WWAN could take many other forms as well, and that the arrangement shown in FIG. 3 is provided by way of example. It should also be noted that, for simplicity of presentation only, neither FIG. 3 nor FIG. 4 include SPN 118, VPN terminator 120, home agent 122, or SIP registrar 124 of FIG. 1.

As shown in FIG. 3, WWAN 104 includes a base transceiver station (BTS) 300, a base station controller/packet control function (BSC/PCF) 302, and a mobile switching center (MSC) 304, which are arranged and coupled with each other in a manner well known in the cellular telephony field. WWAN 104 could also be referred to as a "wireless access network" or "radio access network," as devices communicate with WWAN 104 via an RF air interface.

BTS 300 comprises a tower with antennas that radiate to define air interface 114. And BSC/PCF 302 communicates with wireless devices over that air interface according to an agreed protocol. Example air interface protocols include CDMA, TDMA, GSM, and WiMax. As an example, the air interface protocol could comply with the standards IS-95 and cdma2000®, which are incorporated by reference, any other protocol mentioned herein, or any other protocol.

MSC 304 functions as a switch to provide connectivity with other switches in PSTN 108. Further, MSC 304 may be coupled via a signaling link with a home location register (HLR) 308 that stores account profile records for users of various wireless devices such as device 102. And MSC 304 may include or be interconnected with a visitor location register (VLR) 310 that stores local copies of those profiles for wireless devices that are currently operating within the wireless coverage area of MSC 304. And although FIG. 3 shows BSC/PCF 302 and MSC 304 as separate entities, the two could instead be co-located and integrated together.

WWAN 104 enables suitably-equipped wireless devices, such as multi-mode device 102, to place and receive calls over PSTN 108 and/or over one or more other circuit-switched or packet-switched transport networks. Conventionally, multi-mode device 102 will subscribe to service with a wireless carrier that operates WWAN 104. Therefore, the carrier would have set up multi-mode device 102 to operate under a particular directory number, often known as a "mobile identification number" or "mobile directory number." In particular, the carrier would have programmed the assigned directory number into a Number Assignment Module (NAM) of multi-mode device 102, and the carrier would have established an account profile record in HLR 308 for that directory number and device. Further, device 102 would have a unique electronic serial number (ESN), which may be hard coded or programmed into it.

When device 102 powers on or otherwise enters into the coverage of air interface 114, device 102 registers with MSC 304, such as by sending a registration message over an access channel and via BSC/PCF 302 to MSC 304. MSC 304, in cooperation with other network entities, would then authenticate the device, and HLR 308 would provide MSC 304 with a copy of device 102's profile for storage in VLR 310, and for later reference by MSC 304. Thereafter, device 102 may conduct calls on PSTN 108 via WWAN 104, as is known in the art.

For providing packet-data connectivity to device 102, WWAN 104 includes a PDSN 306, and BSC/PCF 302 includes a packet control function for facilitating communication between device 102 and PDSN 306. In operation, device 102 may request packet-data connectivity by sending a packet-data origination request over an access channel to BSC/PCF 302. BSC/PCF 302 may then engage in signaling with MSC 304 and with PDSN 306, and PDSN 306 and device 102 may negotiate over a traffic channel to establish a data link, such as a point-to-point protocol connection, between device 102 and PDSN 306. After that process is successful, PDSN 306 acts as a network access server, providing device 102 with access to PDN 110.

d. Exemplary Wireless Local Area Network (WLAN)

FIG. 4 is a simplified block diagram of an exemplary WLAN, which may be used in accordance with exemplary embodiments. In particular, FIG. 4 is a diagram of WLAN 106 of FIG. 1. As shown in FIG. 4, WLAN 106 includes a wireless router/access point (hereinafter "access point") 400, a network access device 402, and a data device 404. And it should be understood that a WLAN could take many other forms as well, as FIG. 4 is exemplary.

Access point 400 may have a wired or wireless packet-data connection—such as an Ethernet connection—with network access device 402. And access point 400 may also have wireless (e.g. IEEE 802.11)—and perhaps also wired (e.g. Ethernet)—packet-data connections with one or more devices such as data device 404 and multi-mode device 102. As an example, access point 400 may have an Ethernet interface for connecting with network access device 402, one or more Ethernet interfaces for connecting with other devices (e.g. data device 404), and a wireless-communication interface for wirelessly connecting with devices such as multi-mode device 102 over air interface 116.

And data device 404 could instead connect wirelessly with access point 400, as could other devices, in cases where access point 400 does not provide wired connections (and in those where it does). As an example, access point 400 could be the Linksys WRT54GS. Furthermore, access point 400 could use a wireless protocol other than IEEE 802.11, such as any of the wireless protocols mentioned herein, or any other wireless protocol. Access point 400 may also have a processor and data storage for carrying out the access-point functions described herein.

Network access device 402 may be any device that has (i) a packet-data connection—such as an Ethernet connection—with access point 400 and (ii) a packet-data connection with PDN 110. Network access device 402 thus functions to pass packet-data communications from PDN 110 to access point 400, and to pass packet-data communications from access point 400 to PDN 110. As such, network access device 402 may have interfaces for connecting with access point 400 and with PDN 110, as well as a processor and data storage to aid in carrying out the functions described herein. Network access device 402 could, as examples, be a cable modem or a Digital Subscriber Line (DSL) modem.

In the case of network access device 402 being a cable modem, the communications passing between it and PDN 110 may comply with DOCSIS packet-cable standards, or with some other standards. In that case, the link between network access device 402 and PDN 110 may include coaxial cable, fiber-optic cable, one or more fiber nodes for translating between communications carried on coaxial and fiber-optic cable, a cable headend, and any number of other devices. As an example, network access device 402 may be the Linksys BEFCMU10. As an alternative, access point 400 and network access device 402 could be replaced by a single device that carries out the functions described with respect to both.

Data device 404 may be any computing device physically or wirelessly connected to access point 400. As examples, data device 404 could be a desktop or laptop computer, another multi-mode device, a DVR, an appliance, or any other digital device capable of communicating with access point 400. As another possibility, device 404 may not be present at all, and is included largely to show that access point 400 may be arranged to handle interfacing between network access device 402 and one or more other devices.

3. Exemplary Operation

Figure 5:
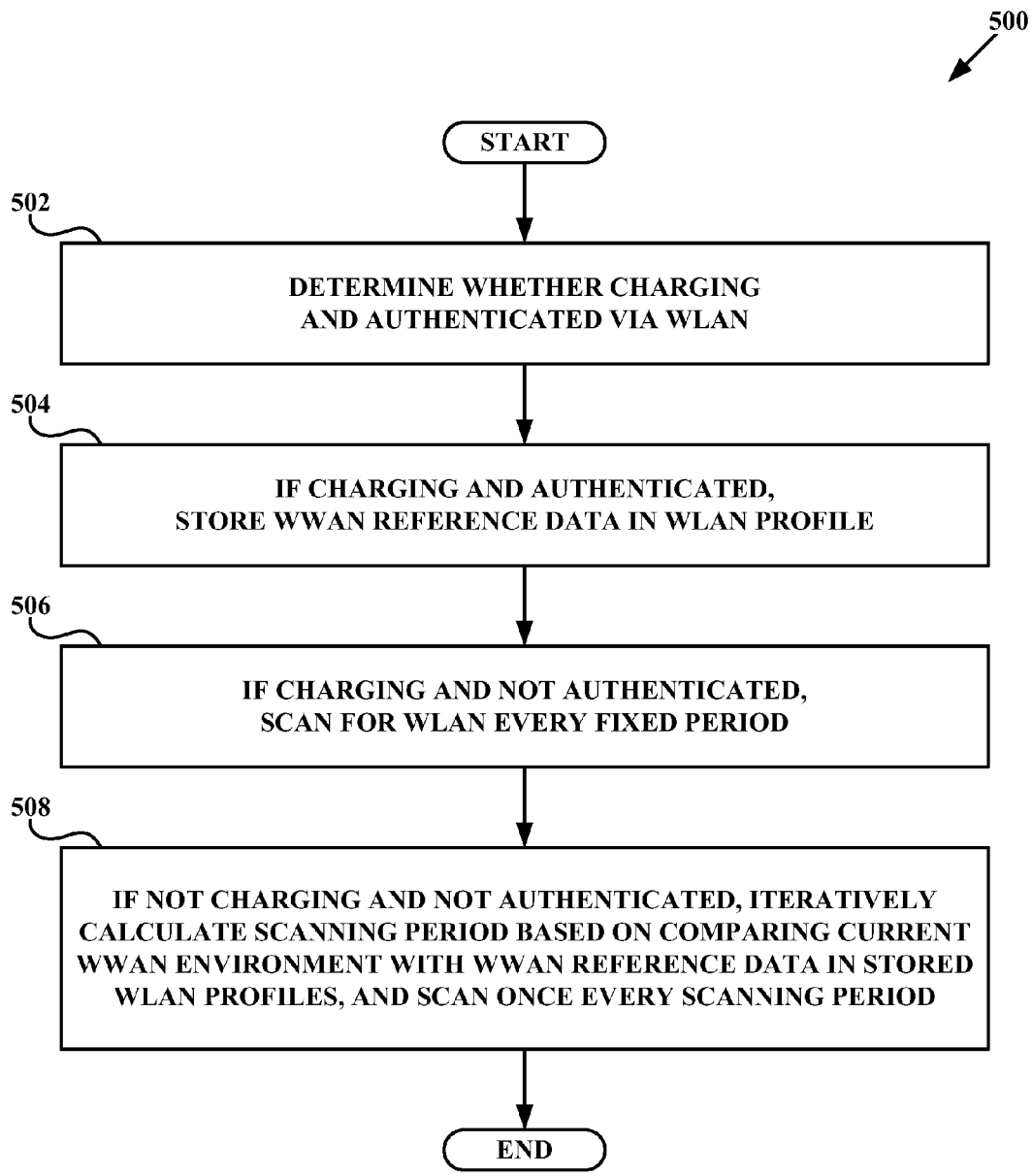
FIG. 5 is a flowchart of an exemplary embodiment, in the form of a method carried out along the communication system of FIG. 1.

FIG. 5 is a flowchart of an exemplary embodiment, in the form of a method carried out along the communication system of FIG. 1. As shown in FIG. 5, the method 500 begins at step 502, when multi-mode device 102 determines whether it is charging and whether it is authenticated via a wireless network that operates according to a first air-interface protocol.

At step 504, if multi-mode device 102 is charging and is so authenticated, it stores reference data in a profile corresponding with the wireless network that operates according to the first protocol and via which the multi-mode device is authenticated, where the reference data reflects a current environment of a wireless network that operates according to a second air-interface protocol different from the first.

At step 506, if multi-mode device 102 is charging and is not so authenticated, it scans once every first amount of time for at least one wireless network that operates according to the first protocol.

At step 508, if multi-mode device 102 is not charging and is not so authenticated, it iteratively: (a) calculates a scanning period based at least in part on comparing the current environment of the wireless network that operates according to the second protocol with reference data from at least one stored profile that (1) corresponds with a wireless network that operates according to the first protocol and (2) includes reference data for the wireless network that operates according to the second protocol and (b) scans once every scanning period for at least one wireless network that corresponds with a stored profile.

These steps are explained in the following subsections. And it should be noted that, although embodiments of the present invention are described as being carried out by multi-mode device 102 alone, it is also contemplated that multi-mode device 102 may carry out embodiments of the present invention in cooperation with one or more network entities.

Please note as well, that, in the balance of this description of method 500, IEEE 802.11 is used as the first air-interface protocol, WLANs (e.g. WLAN 106) are used as wireless networks that operate according to the first air-interface protocol, CDMA is used as the second air-interface protocol, and WWAN 104 is used as the wireless network that operates according to the second air-interface protocol. These are choices made for illustration and clarity of presentation, not for limitation. It is contemplated that any types of wireless networks using any air-interface protocols could be used to carry out embodiments of the present invention.

a. Determine Whether Charging and Authenticated Via a WLAN

At step 502, multi-mode device 102 determines whether it is charging and whether it is authenticated via a WLAN (that operates according to IEEE 802.11).

Multi-mode device 102 determining whether it is charging may involve multi-mode device 102 determining whether it is connected to a charger that is in turn connected to a power source. This could be a charging cable (i.e. plugged into a wall outlet), a travel or vehicle charger, a charging cradle, a portable charger, or the like.

Furthermore, multi-mode device 102 determining whether it is authenticated via a WLAN may involve multi-mode device 102 determining whether it is authenticated with a WLAN access point. In other embodiments, this step may involve multi-mode device 102 determining whether it is authenticated via a WLAN with at least one network entity, such as VPN terminator 120, home agent 122, and/or SIP registrar 124.

b. If Charging and Authenticated Via a WLAN, Store WWAN Reference Data

At step 504, if multi-mode device 102 determines in step 502 that it is charging and is authenticated via a WLAN, it stores WWAN reference data in a WLAN profile corresponding with the WLAN (e.g. WLAN 106) with which multi-mode device 102 is authenticated. The reference data reflects a current environment of WWAN 104. Thus, multi-mode device 102 may maintain a WLAN-106 profile (which may be the "Home" profile of FIG. 2A), that includes an SSID (SSID1), a BSSID (BSSID1), and access data (Password1) for WLAN 106. Furthermore, multi-mode device 102 may store in that profile the currently-detected SID (SID City1), NID (NID_1A), PZID (PZID_1A), and three strongest PN offsets ({A, B, C}) in multi-mode device 102's CDMA (i.e. WWAN 104) active set. In effect, multi-mode device 102 treats the condition of simultaneous charging and authentication via WLAN 106 as a good proxy for permanence, and responsively stores data reflecting the current environment of WWAN 104.

c. If Charging and not Authenticated Via a WLAN, Scan for WLAN Coverage at Fixed Intervals At step 506, if multi-mode device 102 determines in step 502 that it is charging and is not authenticated via a WLAN, it scans once every first amount of time (e.g. two minutes) for at least one WLAN. In effect, being in the charging state releases multi-mode 102 from concerns about draining battery power. As such, multi-mode device 102 scans for WLAN coverage at fixed intervals.

d. If not Charging and not Authenticated Via a WLAN, Iteratively Calculate a Scanning Period and then Scan for WLAN Coverage Once Every Calculated Scanning Period At step 508, if multi-mode device 102 determines in step 502 that it is not charging and is not so authenticated, it iteratively: (a) calculates a scanning period, where this is based at least in part on comparing the current WWAN-104 environment with reference data from at least one stored WLAN profile and (b) scanning once every scanning period for at least one WLAN that corresponds with a stored WLAN profile. And multi-mode device 102 may also keep track of a current number of scans for at least one WLAN that corresponds with a stored WLAN profile, and calculating the scanning period in step 508 may also be based at least in part on the current number of scans.

In some embodiments, calculating the scanning period may involve deriving a set of one or more multiplicands and then calculating the scanning period as the product of a predefined timer value (e.g. 4 seconds or 1000 ms) and the one or more multiplicands in the set. In some embodiments, one or more of the multiplicands may be derived from the degree to which the current WWAN-104 environment (which may be stored in WWAN data 250 of FIG. 2B matches one or more stored WLAN profiles (or perhaps the collection of all stored profiles). That is, in some embodiments, all of the profiles may be treated collectively as a data set to be matched against the currently-detected WWAN-104 environment. In other embodiments, it may be the case that each stored WLAN profile's WWAN reference data is evaluated on a WLAN-profile-by-WLAN profile basis, and perhaps the best-matching WLAN profile is used to determine the multiplicands that are used to calculate the scanning period.

In one embodiment, multi-mode device may assign different multiplicands to different combinations of matching the SID, NID, and PZID. For example, matching all three could be associated with a multiplicand of 1, while matching SID and NID but not PZID could be associated with a multiplicand of 60. In other embodiments, a failure to match NID and PZID may be associated with a multiplier of 0, regardless of whether the SID matches. Note that any multiplicand equaling 0 will cause there to be no scanning for WLAN coverage.

In some embodiments, the PN offsets in the WLAN profiles may be treated separately from the {SID, NID, PZID} set. That is, the degree to which the, for example, strongest three PN offsets in multi-mode device 102's active set matches the three PN offsets in a stored WLAN profile may be associated with its own multiplicand, independent of the multiplicand determined in connection with the {SID, NID, PZID} set. So, for example, if a given WLAN profile has no stored PN offsets, this could be a multiplicand of 1.5. If one of the three matches, this could be a 2. If two of the three match, this could be a 1.5. If all three match, this could be a 0.5. If the WLAN profile has PN offsets but none of them match, this could be a 0. And many other implementation choices are clearly possible.

As stated above, in some embodiments, multi-mode device 102 may keep track of a current number of scans for at least one WLAN that corresponds with a stored WLAN profile. As such, one of the multiplicands used for computing the scanning period may be based on the current number of scans. For example, following a reset of the scan counter, the first ten scans could be associated with a multiplicand of 1, while scans 11-35 could be associated with a multiplicand of 10, scans 36-45 could be associated with a multiplicand of 30, scans 46-55 could be associated with a multiplicand of 60, and all scans after 55 could be associated with a multiplicand of 120. And these are clearly just examples, as any suitable values could be used.

It can be seen, however, that using numbers such as these would result in the multi-mode device scanning less and less frequently as more and more scans failed to find a suitable WLAN.

Thus, in an example where multi-mode device moves (e.g. is driven) farther and farther away from, say, the Home WLAN 106 (and not closer to any other profiled WLANs), and is not connected to a charger, multi-mode device 102 will scan for WLAN coverage quite infrequently.

If, however, multi-mode device 102 is then transported back towards Home WLAN 106 (and still not connected to a charger), at a certain point multi-mode device 102 will detect that the current WWAN-104 environment has become a better match with the WWAN reference data in the Home-WLAN-106 profile than it was previously.

In that situation, multi-mode device 102 may responsively (i) immediately scan for a WLAN that corresponds with a stored WLAN profile and (ii) reset the current-number-of-scans counter to zero. As more matching-improvement events occur (e.g. matching all three of SID, NID, and PZID and then gradually matching one, two, and then three PN offsets), device 102 may, each time, immediately scan for profiled WLANs and then reset the scan counter, to more quickly acquire a profiled WLAN.

In some embodiments, multi-mode device 102 may receive from a user a command to scan for WLAN coverage, and responsively start scanning. While scanning, multi-mode device 102 may detect a WLAN, and responsively authenticate with at least one network entity (e.g. a VPN terminator, home agent, and/or SIP entity) via the WLAN. In response to authenticating with the at least one network entity via the WLAN, multi-mode device 102 may store a profile corresponding to that WLAN, and include in that profile reference data reflecting the current environment of a WWAN such as WWAN 104.

In some embodiments, multi-mode device 102 may determine that it is engaged in a communication session (i.e. a VoIP call or other packet-data session) via a particular WLAN, and further determine that its stored profile corresponding to that WLAN does not currently include reference data reflecting the current WWAN environment. In response to identifying these conditions, multi-mode device 102 may update its profile for that WLAN to include that WWAN reference data.

In general, upon successfully connecting with a given WLAN (e.g. authenticating with the WLAN access point and perhaps also with one or more of the network entities mentioned herein via the given WLAN), multi-mode device 102 may hand off from the WWAN to the given WLAN. That is, multi-mode device 102 may conduct a vertical handoff from the WWAN to the given WLAN, perhaps at its own initiative, or perhaps in response to receiving a command to do so, perhaps from the WWAN, and perhaps via the WWAN and/or the given WLAN. And other implementations are certainly possible without departing from the scope and spirit of the present invention, which is defined by the claims.

4. Conclusion

Various exemplary embodiments have been described above. Those skilled in the art will understand, however, that changes and modifications may be made to those examples without departing from the scope of the claims.

The invention claimed is:

1. A method comprising:
a multi-mode device determining whether it is charging and whether it is authenticated via a wireless network that operates according to a first air-interface protocol;
if the multi-mode device determines that it is both charging and so authenticated, the multi-mode device storing reference data in a profile corresponding with the wireless network, hereinafter referred to as the first wireless network, that operates according to the first protocol and via which the multi-mode device is authenticated, wherein the reference data (i) comprises multiple data fields and (ii) reflects a current environment of a second wireless network at a first point in time at which the multi-mode device is both charging and authenticated via the first wireless network, and wherein the second wireless network operates according to a second air-interface protocol that is different from the first; and
after storing the reference data in the profile corresponding with the first wireless network, the multi-mode device detecting at a second point in time that a current environment of the second wireless network matches, with respect to at least a certain number of the multiple data fields, the reference data stored in the profile corresponding with the first wireless network, and responsively scanning for coverage according to the first air-interface protocol, wherein the second point in time occurs later in time than the first.

2. The method of claim 1, wherein determining whether the multi-mode device is charging comprises determining whether the multi-mode device is connected to a charger that is in turn connected to a power source.

3. The method of claim 1, wherein wireless networks that operate according to the first air-interface protocol are wireless local area networks (WLANs).

4. The method of claim 3, wherein wireless networks that operate according to the second air-interface protocol are wireless wide area networks (WWANs).

5. The method of claim 1, wherein wireless networks that operate according to the second air-interface protocol are wireless wide area networks (WWANs).

6. The method of claim 1, wherein the first air-interface protocol is an Institute of Electrical and Electronics Engineers (IEEE) 802.11 protocol.

7. The method of claim 6, wherein the second air-interface protocol is a code division multiple access (CDMA) protocol or an Institute of Electrical and Electronics Engineers (IEEE) 802.16 protocol.

8. The method of claim 1, wherein the second air-interface protocol is a code division multiple access (CDMA) protocol or an Institute of Electrical and Electronics Engineers (IEEE) 802.16 protocol.

9. The method of claim 1, wherein determining whether the multi-mode device is authenticated via a wireless network that operates according to the first protocol comprises determining whether the multi-mode device is authenticated with an access point of a wireless network that operates according to the first protocol.

10. The method of claim 1, wherein determining whether the multi-mode device is authenticated via a wireless network that operates according to the first protocol comprises determining whether the multi-mode device is authenticated with at least one network entity via a wireless network that operates according to the first protocol.

11. The method of claim 10, wherein the at least one network entity comprises at least one of a virtual private network (VPN) terminator, a Mobile-IP home agent, and a Session Initiation Protocol (SIP) registrar.

12. The method of claim 1, wherein the profile corresponding with the wireless network that operates according to the first protocol comprises at least one of a Service Set Identifier (SSID), a Basic Service Set Identifier (BSSID), and access data for the wireless network that operates according to the first protocol.

13. The method of claim 1, wherein the multiple data fields include at least one of a system identification code (SID), a network identification code (NID), a packet zone ID (PZID), and a first number of pseudorandom number (PN) offsets.

14. The method of claim 1, wherein, if the multi-mode device determines that it is both not charging and is not so authenticated, the multi-mode device iteratively carrying out the following steps:
(a) calculating a scanning period, wherein calculating the scanning period comprises calculating the scanning period based at least in part on comparing the current environment of the second wireless network with reference data from at least one stored profile that
(1) corresponds with a wireless network that operates according to the first protocol and
(2) includes reference data for the second wireless network; and
(b) scanning once every scanning period for at least one wireless network that corresponds with a stored profile.

15. The method of claim 14, wherein the first amount of time is 2 (two) minutes.

16. The method of claim 14, further comprising keeping track of a current number of scans for at least one wireless network that corresponds with a stored profile, wherein calculating the scanning period further comprises calculating the scanning period based at least in part on the current number of scans.

17. The method of claim 14, wherein calculating the scanning period comprises:
deriving a set of one or more multiplicands, and
calculating the scanning period as the product of a predefined timer value and the one or more multiplicands in the set.

18. The method of claim 17, wherein deriving the set of one or more multiplicands comprises deriving at least one multiplicand based on whether the reference data from at least one stored profile matches the current environment of the wireless network that operates according to the second protocol with respect to one or more of system identification code (SID), network identification code (NID), packet zone ID (PZID), and a set of pseudorandom number (PN) offsets.

19. The method of claim 18, wherein the set of PN offsets corresponds to a first number of the strongest PN offsets in the multi-mode device's active set.

20. The method of claim 18, further comprising keeping track of a current number of scans for at least one wireless network that corresponds with a stored profile, wherein deriving the set of one or more multiplicands comprises deriving at least one multiplicand based on the current number of scans.

21. The method of claim 20, further comprising detecting that the reference data from at least one stored profile matches the current environment of the second wireless network with respect to one or more of SID, NID, PZID, and the set of PN offsets better than in a prior iteration, and responsively (i) scanning for at least one wireless network that corresponds with a stored profile and (ii) resetting the current number of scans.

22. The method of claim 1, further comprising determining that the multi-mode device is engaged in a communication session via a first wireless network that operates according to the first protocol, and further determining that a stored profile corresponding to the first wireless network does not currently comprise reference data reflecting the current environment of the wireless network that operates according to the second air-interface protocol, and responsively updating the profile to include that reference data.

23. The method of claim 1, further comprising connecting with a first wireless network that operates according to the first protocol, and then handing off from the wireless network that operates according to the second protocol to the first wireless network.

24. The method of claim 1, further comprising:
receiving from a user a command to scan for at least one wireless network that operates according to the first protocol, and responsively so scanning;
while so scanning, detecting a first wireless network that operates according to the first protocol, and responsively authenticating with at least one network entity via the first wireless network; and
in response to authenticating with the at least one network entity, storing a profile corresponding to the first wireless network, the profile including reference data reflecting the current environment of the wireless network that operates according to the second protocol.

25. A multi-mode device comprising:
a first wireless-communication interface for communicating according to a first air-interface protocol;
a second wireless-communication interface for communicating according to a second air-interface protocol different from the first;
a processor; and
data storage having program instructions executable by the processor for carrying out a set of functions, the set including:
the multi-mode device determining whether it is charging and whether it is authenticated via a wireless network that operates according to a first air-interface protocol;
if the multi-mode device determines that it is both charging and so authenticated, the multi-mode device storing reference data in a profile corresponding with the wireless network, hereinafter referred to as the first wireless network, that operates according to the first protocol and via which the multi-mode device is authenticated, wherein the reference data (i) comprises multiple data fields and (ii) reflects a current environment of a second wireless network at a first point in time at which the multi-mode device is both charging and authenticated via the first wireless network, and wherein the second wireless network operates according to a second air-interface protocol that is different from the first; and
after storing the reference data in the profile corresponding with the first wireless network, the multi-mode device detecting at a second point in time that a current environment of the second wireless network matches, with respect to at least a certain number of the multiple data fields, the reference data stored in the profile corresponding with the first wireless network, and responsively scanning for coverage according to the first air-interface protocol, wherein the second point in time occurs later in time than the first.

* * * * *